Aug. 14, 1945.  K. B. KILBORN  2,382,569
RUBBER CUSHIONING UNIT AND METHOD OF MAKING SAME
Filed Nov. 28, 1941  2 Sheets-Sheet 1

Inventor
Karl B. Kilborn
By K. W. Waters
Attorney

Aug. 14, 1945.   K. B. KILBORN   2,382,569
RUBBER CUSHIONING UNIT AND METHOD OF MAKING SAME
Filed Nov. 28, 1941   2 Sheets-Sheet 2

Inventor
Karl B. Kilborn

Patented Aug. 14, 1945

2,382,569

UNITED STATES PATENT OFFICE 2,382,569

RUBBER CUSHIONING UNIT AND METHOD OF MAKING SAME

Karl B. Kilborn, Akron, Ohio, assignor to Wingfoot Corporation, Akron, Ohio, a corporation of Delaware Application November 28, 1941, Serial No. 420,845

11 Claims. (Cl. 154—2)

This invention relates to rubber cushioning members, and, more particularly is concerned with such members having concentric inner and outer parts joined with a body of rubber, and with the method of making the same.

Heretofore, various types of rubber bushings, rubber torsion units, and the like have been provided in which an inner member in the form of a tube or shaft is positioned concentrically of an outer tubular member and joined thereto by an interposed body of rubber vulcanized to both members. However, when such bushings or units are made in relatively large sizes and of considerable length a very definite problem exists in vulcanizing the rubber to the inner and outer members without the trapping of air which causes separation of the parts in use.

Furthermore, in order to obtain the best possible type of bond between the metal and the rubber of the bushing or unit, it is the usual practice to brass plate the metal, coat the metal with rubber cement, and then place a thin layer of rubber stock, called tie gum, over the cement. However, with the tie gum in position on the outside tube it is very difficult and often impossible to slide the tube over the rubber body positioned on the inside tube without completely disrupting the tie gum. The disrupting and air trapping action is particularly objectionable when the outside tube is of a length more than about twice its diameter.

It is the general object of my invention to avoid and overcome the foregoing and other difficulties and objections by the provision of an improved rubber cushioning unit of substantially any size, and particularly where the length is several times the diameter, and in which the rubber body is securely vulcanized to inner and outer metal portions and without the trapping of air or the disrupting of the tie gum throughout the entire contacting areas.

Another object of my invention is to provide an improved method for making relatively large or long rubber bushings or torsion units and whereby the rubber body incorporated in the unit is securely vulcanized to the metal parts thereof without the trapping of air or disrupting of the tie gum, and with a minimum of time, apparatus requirements, and cost.

The foregoing and other objects of my invention are achieved by the provision of an improved rubber cushioning means including a tubular outer member, an inner member received within the outer member and spaced therefrom, a body of rubber positioned between the inner and outer members and vulcanized thereto, said unit being characterized by an outer member which is formed from a plurality of more than two parts having substantially abutting edges so as to allow the escape of air during the vulcanizing operation and to facilitate assembly. More specifically, the unit is characterized by an outer member formed from a plurality of relatively narrow rings abutting in side by side relation, each ring having a key associated therewith and in alignment with keys carried by adjacent rings. In a modified form of the invention the outer member takes the form of a helical spring having closely adjacent convolutions.

Stated in terms of method my invention includes the steps of covering an inner metal member with a body of rubber between the ends thereof, coating the inner periphery of a plurality of relatively narrow substantially circumferentially extending members with tie gum, positioning said members around the outer periphery of the rubber body, and vulcanizing the rubber body by the application of heat thereto and while under pressure so as to cause a flow of any air trapped between the rubber body and the plurality of metal members radially outwardly between the metal members.

For a better understanding of my invention reference should be had to the accompanying drawings wherein.

Figure 1:
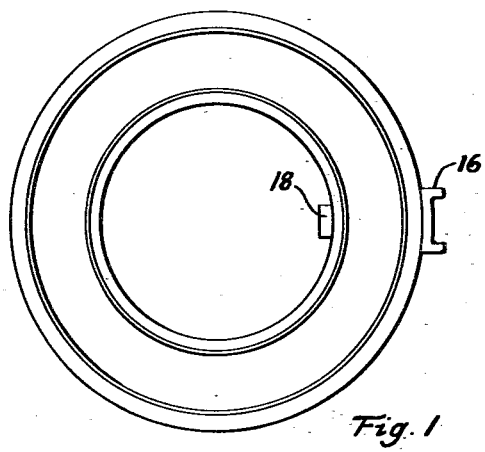
Fig. 1 is an end elevation of one embodiment of my invention.

In the drawings, the numeral 10 indicates an inner member, which may be in the form of a shaft or which may comprise a tube as shown, and which usually is made of metal suitably treated as by brass coating and covered with a bonding layer of cement or tie gum or both, indicated by the numeral 11, so as to facilitate the vulcanization of rubber thereto. Surrounding the inner member 10 and layer 11 is a body of rubber 12 which extends circumferentially of the inner member 10 and which completely covers the inner member 10 at least over a portion of the length thereof. In the embodiment of the invention illustrated in the drawings the rubber body 12 extends substantially to the ends of the inner member 10, but it should be understood that the ends of the member 10 may extend axially beyond the rubber body if this be desired. The outer member 14 associated with the cushioning unit illustrated may take a plurality of forms as long as the member is formed from a plurality of more than two pieces having substantially abutting edges so as to allow the escape of air from between the inner periphery of the member and the outer periphery of the rubber body 12. In the form of the invention illustrated the outer member 14 comprises a plurality of relatively narrow metal rings which abut substantially in end to end contact and which usually are appropriately treated, as by brass plating and covered with a layer 15 of cement or tie gum, or both, to facilitate the vulcanization of rubber thereto. Each one of the metal rings of the outer member 14 is generally provided with a key 16 which may be spot welded, brazed, or otherwise secured thereto, and the several keys thus provided are aligned longitudinally with each other so that when the rubber cushioning unit is received in a housing the keys will serve to hold the several rings of the outer member 14 so that they will move together as a single unit. The inner member 10 may be formed with a key 18 if this is found advisable for any given installation. Instead of using keys 16 and 18 on the metal members, I may provide rough, serrated or ribbed peripheries on the members for facilitating the gripping of the members in the use of the unit.

Figure 7:
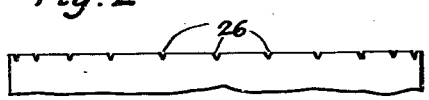
Fig. 7 is a side elevation, partly broken away, of a modified form of ring which may be used in the assembly.

In accordance with the method of the invention, the layer 11 is provided on the inner member 10 and the rubber body 12 is wound as one or more layers over the layer 11 on the inner member 10, and the rings of the outer member 14 with the layers 15 thereon are moved over the periphery of the rubber body 12 by hand, or by the use of funnel-shaped guides, or by other suitable means. It will be understood that no air is trapped between the inner member 10 and the rubber body 12 because the body 12 is wound around the member 10 in a circumferential direction to progresively exclude the air. Because of the relatively short axial length of each of the rings of the outer members and because of the plurality of rings, it is a relatively simple procedure to position each ring in turn over the rubber body 12 without disrupting the layer 15 particularly where lubricating cement is coated on the inner periphery of the layer 15. The unit thus provided is then placed within the mold shown in Figs. 5 and 6 of the drawings which includes an inside tube 30, an outside tube 32 and rather loosely fitting end plates 34 around which air may escape. The complete assembly is secured together by suitable means (not shown), and is then subjected while the rubber is under pressure to the action of vulcanizing heat, for example, in a steam chamber. The heat and pressure on the rubber body causes any air which might possibly be trapped between the inner periphery of the layer 15 on the outer member 14 and the outer periphery of the rubber body 12 to escape between the slits or small clearance spaces provided between the abutting ends or sides of adjacent rings. Further, the rubber body itself tends to flow under the heat and pressure into any clearance spaces between adjacent rings, and I contemplate forming small notches 26 or scallops on the edge of the rings (see Fig. 7) so that the flow of air and rubber therethrough may be enhanced.

Figure 3:
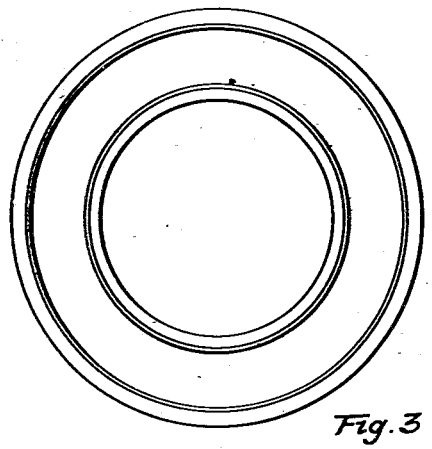
Fig. 3 is an end elevation of a modified form of my invention.
Figure 2:
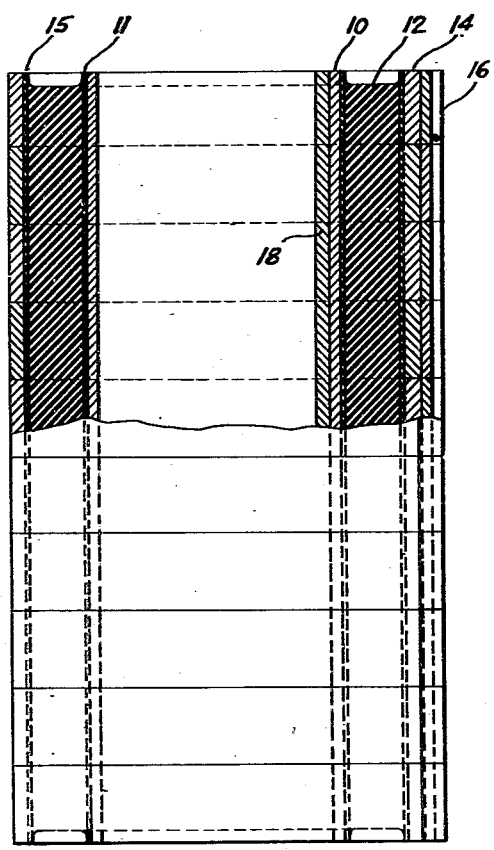
Fig. 2 is a side elevation, partly in diametric section, of the rubber cushioning means illustrated in Fig. 1.
Figure 4:
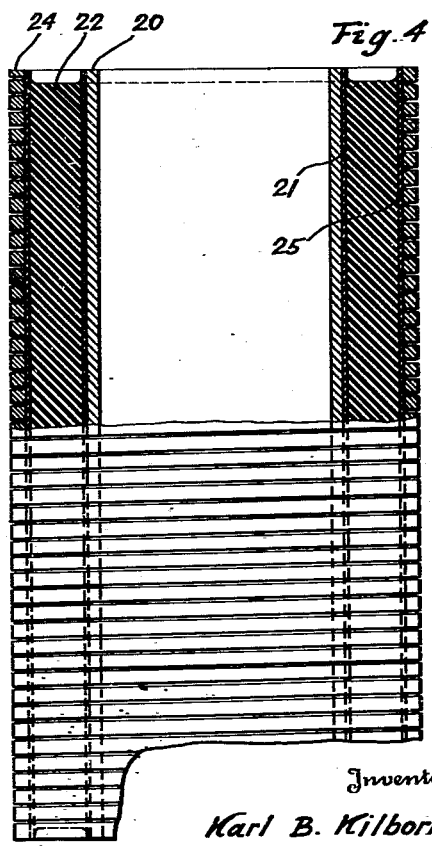
Fig. 4 is a side elevation, partly in diametric section of the cushioning unit shown in Fig. 3.

In the modification of my invention illustrated in Figs. 3 and 4, the numeral 20 indicates an inner member which may be in the form of a shaft or a hollow tube, which latter is particularly shown, and the inner member 20 is usually made of metal and is suitably treated as by plating and covering with a rubber layer 21 so as to facilitae the vulcanization of rubber thereto. Surrounding the inner member 20 is a body of rubber 22 which extends circumferentially of the inner member and is positioned between the ends thereof. The rubber body 22 may extend completely to the ends of the tube 20 or may be terminated short thereof to best adapt the unit to any given installation.

Surrounding the rubber body 22 is an outer member 24 which is generally made of metal and is suitably treated, as by plating and a rubber layer 25, to facilitate the vulcanization of the rubber body 22 directly thereto. The outer member 24 takes the form of a helical coil made of substantially square wire and having closely adjacent convolutions. In fact, the convolutions are so closely adjacent to each other that any possible spring function of the outer member 24 is substantially completely lost particularly in compression. Obviously, the cross-sectional contour of the wire may be other than square, and for example may be round, rectangular, or may take other shapes.

In the manufacture of the cushioning unit shown in Figs. 3 and 4 the inner member 20 is covered with the layer 21 and with a layer of rubber by winding one or more thicknesses of rubber around the inner member 20, and, thereafter, the outer member 24, which is usually coated with the layer 25, may be untwisted slightly so as to spring open to an increased diameter and the rubber body 22 and the inner member 20 are slipped inside of the outer member 24, generally with rubber cement lubricating the operation. Thereafter, the ends of the spring outer member 24 are released to allow the spring to tighten down snugly around the rubber body. Alternatively, the rubber body 22 carried on the inner member 20 may be forced into the inside of the outer member 24 with the aid of lubricating cement and funnel-shaped devices and in a manner that will be understood. The ends of any of the coils of the outer member may be tack brazed or welded before or after vulcanization to reduce uncoiling of the outer member.

Figure 5:
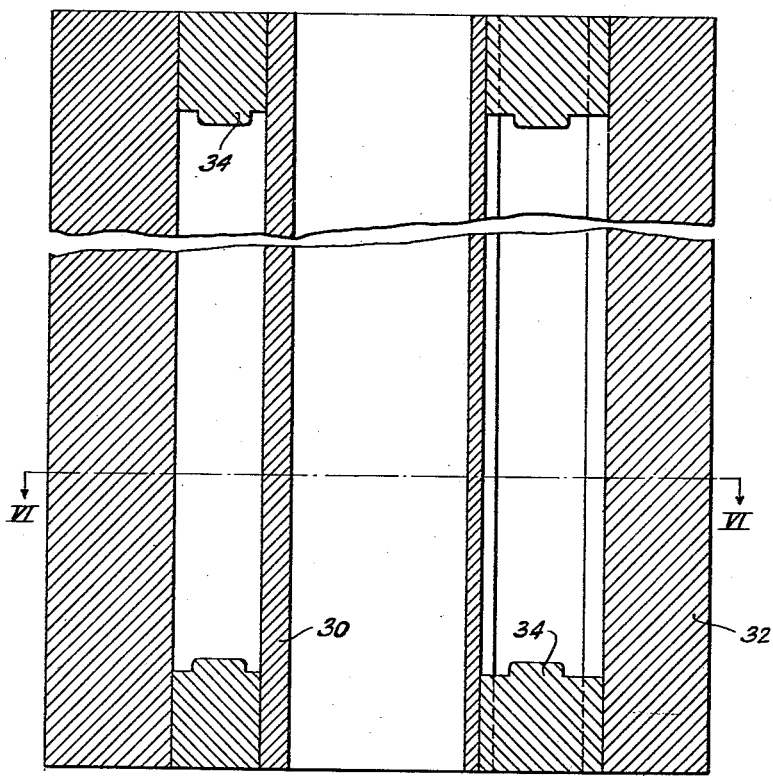
Fig. 5 is a longitudinal diametric cross-sectional view of a typical mold for vulcanizing the rubber cushioning members.
Figure 6:
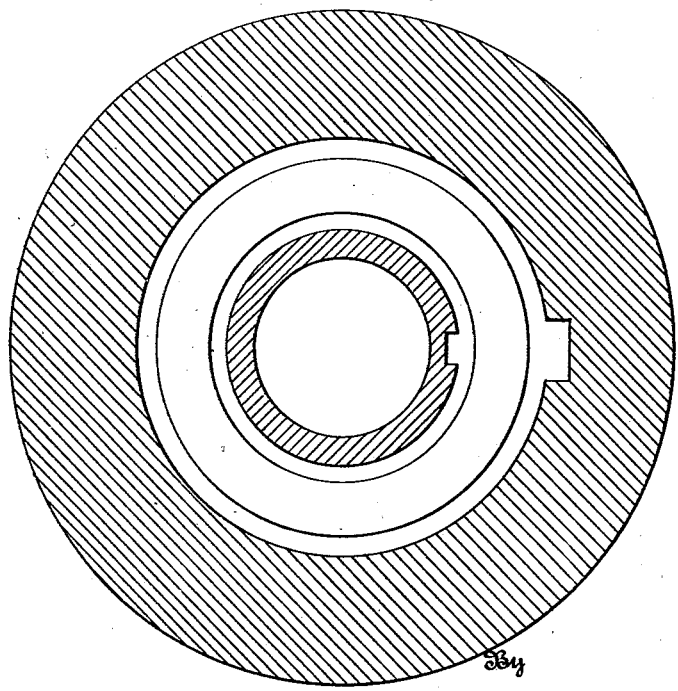
Fig. 6 is a transverse cross-sectional view taken on line VI—VI of Fig. 5.

With the parts assembled as illustrated, the unit is placed in the mold of Figs. 5 and 6, the rubber is subjected to pressure, and the complete assembly is heated by steam or other vulcanizing means so that the rubber body is securely vulcanized to the inner member 20 and the outer member 24. During the vulcanizing operation any air tending to be trapped between the layer 25, the outer member 24 and the rubber body 22 is free to escape between the slits of the closely adjacent convolutions of the spring outer member 24. Further, under the action of the heat and pressure the rubber body 22 tends to flow radially outwardly between the surfaces of adjacent convolutions of the outer member 24 and thus increases the amount of surface to which the rubber adheres. In fact, I may proportion the rubber body 22 to the diameter of the outer member 24 so that the rubber will flow completely to the outside of the outer member 24 during the vulcanizing operation. Again, I may place a thin layer of rubber around the outside of the outer member 24 prior to vulcanization, although this is not preferred.

The form of my invention shown in Figs. 3 and 4 may include keys which are welded or otherwise secured to both the inner member 20 and the outer member 24 if this be desired.

From the foregoing it will be recognized that the objects of my invention have been achieved by the provision of an improved rubber cushioning unit particularly adapted to be made in large size and long lengths without the trapping of air therein during the vulcanizing operation. The improved unit is relatively inexpensive to manufacture and is adapted to withstand particularly long and strenous service without failure. The improved method of manufacture is simple, inexpensive, and readily performed by the ordinary operator and requires no elaborate or expensive apparatus.

While in accordance with the patent statutes I have particularly illustrated and described my invention it should be understood that I am not to be limited thereto or thereby but that the scope of my invention is defined in the appended claims.

For example, the term "rubber" as used in the specification and claims is intended to include natural and synthetic rubber and other similar substances.

I claim:

1. A rubber cushioning unit including a relatively long inner metal tube, a bonding layer on the tube, a body of rubber surrounding the bonding layer on the inner metal tube for a considerable portion of its length and vulcanized thereto, a bonding layer over the outer periphery of the rubber body and an outer metal member having a length more than twice its diameter surrounding the body of rubber and vulcanized thereto, said outer metal member being divided substantially circumferentially at a plurality of longitudinally spaced points but with the divided portions thereof being in substantially end to end abutting relation, and with the rubber body extending radially outwardly between any clearances in the divided portions of the outer metal member.

2. A vibration absorbing unit including an inner metal tube, a body of rubber surrounding the inner metal tube for a considerable portion of its length and vulcanized thereto, and an outer metal member surrounding the body of rubber and vulcanized thereto, said outer metal member being divided substantially circumferentially at a plurality of longitudinally spaced points but with the divided portions thereof being in substantially end to end abutting relation.

3. A rubber cushioning unit including an inner metal tube, a body of rubber surrounding the inner metal tube for a considerable portion of its length and vulcanized thereto, and an outer metal member surrounding the body of rubber and vulcanized thereto, said outer metal member being divided substantially circumferentially at a plurality of longitudinally spaced points, and with the rubber body extending radially outwardly between any clearances in the divided portions of the outer metal member.

4. A rubber torsion unit, or the like, including a tubular outer member, an inner member received within the outer member and spaced therefrom, a body of rubber positioned between the inner and outer members and vulcanized thereto, said unit being characterized by an outer member formed with more than two completely circular parts engaging in substantially end to end abutting relation and adapted to be gripped and turned together.

5. A rubber torsion unit, or the like, including a tubular outer member, an inner member received within the outer member and spaced therefrom, a bonding layer of rubber on the outer periphery of the inner member, a bonding layer of rubber on the inner periphery of the outer member, a body of rubber positioned between the inner and outer members and vulcanized thereto, said unit being characterized by an outer member formed with more than two fully circular parts engaging substantially in end to end relation so as to provide over substantially its entire surface partially abutting edges of the parts to allow the escape of air during the vulcanizing operation.

6. A rubber torsion unit including a tubular outer member, an inner member received within the outer member and spaced therefrom, a body of rubber positioned between the inner and outer members and vulcanized thereto, said unit being characterized by an outer member formed from a plurality of relatively narrow rings abutting in side by side relation, and a key carried by each ring and in alignment with adjacent keys.

7. A rubber torsion unit including a tubular outer member, an inner member received within the outer member and spaced therefrom, a body of rubber positioned between the inner and outer members and vulcanized thereto, said unit being characterized by an outer member formed from a helically coiled wire having its convolutions substantially engaging each other.

8. A rubber torsion unit including a tubular outer member, an inner member received within the outer member and spaced therefrom, a body of rubber positioned between the inner and outer members and vulcanized thereto, said unit being characterized by an outer member formed from a helically coiled wire.

9. A rubber cushioning unit including a tubular outer member, an inner member received within the outer member and spaced therefrom, a body of rubber positioned between the inner and outer members and vulcanized thereto, said unit being characterized by an outer member formed from a plurality of relatively narrow rings abutting in side by side relation.

10. A rubber torsion unit including a tubular outer member, an inner member received within the outer member and spaced therefrom, a body of rubber positioned between the inner and outer members and vulcanized thereto, said unit being characterized by an outer member formed from a plurality of relatively narrow rings, and a key carried by each ring and in alignment with adjacent keys.

11. That method of making a rubber cushioning unit having concentric inner and outer members and an interposed body of rubber which method includes the steps of covering an inner metal member with a body of rubber between the ends thereof, expanding a helically coiled outer metal member and slipping the expanded member over the rubber body, releasing the expanding of the outer metal member to allow it to snap back around the rubber body, and vulcanizing the rubber body by applying heat and pressure thereto and to bond the rubber to the metal members.

KARL B. KILBORN.